United States Patent Office 3,728,086
Patented Apr. 17, 1973

---

3,728,086
METHOD OF PREPARING AMMONIUM PERCHLORATE CRYSTALS OF CONTROLLED SIZE
Arnold Adicoff, China Lake, Calif., assignor to the United States of America as represented by the Secretary of the Navy
No Drawing. Filed Apr. 17, 1969, Ser. No. 818,184
Int. Cl. C01d 1/30
U.S. Cl. 23—302                                    5 Claims

ABSTRACT OF THE DISCLOSURE

A method for preparing uniform well-defined ammonium perchlorate crystals of controlled size which comprises dissolving ammonium perchlorate in an organic solvent and then precipitating in a mixture of an organic solvent and non-solvent for ammonium perchlorate. The ratio of solvent to non-solvent in the precipitating solution determines the size of the resulting crystals.

GOVERNMENT INTEREST

The invention described herein may be manufactured and used by or for the Government of the United States of America for governmental purposes without the payment of any royalties thereon or therefor.

BACKGROUND OF THE INVENTION

The invention relates to a method of producing ammonium perchlorate crystals of controlled uniform size and shape having well-defined crystalline structure.

The customary method of preparing ammonium perchlorate crystals involves the aqueous recrystallization of ammonium perchlorate from water and subsequent grinding of the ammonium perchlorate by grinding procedures such as ball mills and grinding mills, often with an inert solvent. The resulting product has a broad particle size distribution of irregularly shaped particles having many grain boundaries and containing inclusions of moisture. Particle size control by these methods is obtained by grinding and sieving. The particles are sized by being passed through one screen mesh and retained by a finer mesh screen. The present invention provides a method for the continuous production of particles of ammonium perchlorate of controlled particle size. The distribution of particle size is narrow, the purity and moisture content can be controlled, and the crystals thus produced are well-defined rather than the irregular crushed crystals.

It is a general object of this invention to produce ammonium perchlorate crystals which are small, uniform and well-defined with little or no occluded moisture for use as a composite propellant ingredient. Another object is to provide ammonium perchlorate crystals which can be contaminated with selected burning rate modifiers for use in propellant, explosive, and pyrotechnic compositions.

DESCRIPTION OF THE INVENTION

In accordance with the present invention a predetermined amount of organic solvent for ammonium perchlorate (AP) such as tetrahydrofuran and acetone is continuously percolated through a bed of ammonium perchlorate where it becomes saturated therewith. The saturated solvent is then precipitated into a mixture comprising a predetermined amount of the solvent for ammonium perchlorate and a predetermined amount of non-solvent for ammonium perchlorate such as hexane. The resulting crystals are of uniform size. For example 10 micron sized particles varied in size in the order of only ±3 microns, while with the larger crystals of .28 mm. particle size a range of ±.13 mm. was observed. The ratio of solvent to non-solvent in the precipitating solution determines the particle size of the resulting crystals.

The method described herein may be diagrammatically ilustrated as follows:

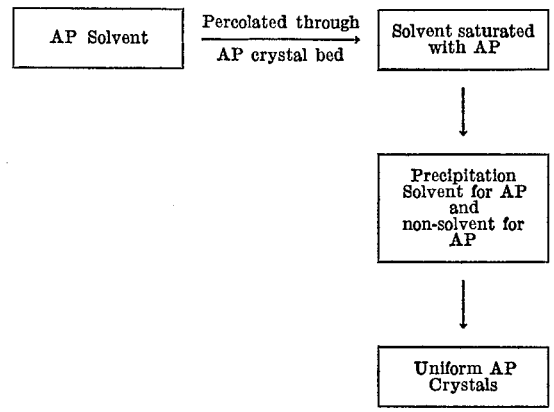

The ratio of solvent to non-solvent determines the size of the ammonium perchlorate crystals.

The crystals produced by this invention were prepared in a laboratory apparatus that has been used to circulate the solvent—non-solvent solution. A total of 2800 cc. tetrahydrofuran and Soltrol 180 (a high boiling hydrocarbon) were placed in a large precipitation pot and some of the mixture was allowed to flow through a leveling tube into a distilling pot where it was heated. The volatile tetrahydrofuran is distilled over to a condenser positioned above the ammonium perchlorate bed where it is condensed and allowed to trickle through the ammonium perchlorate crystals, then through a sintered glass filter into the precipitation pot. The non-solvent, Soltrol 180, is returned to the precipitation pot permitting more of the mixture of solvent—non-solvent to enter the distilling pot via the leveling tube.

The following are examples produced by the above-described process:

| Sample | Initial weight Fraction | Final weight Fraction | Particle size product (micron) |
|---|---|---|---|
| I | 0.167 (THF) | 0.123 (THF) | 1.21±0.38 |
| II | 0.550 (THF) | 0.520 (THF) | 31.3±7.9 |
| III | 0.818 (THF) | 0.818 (THF) | 61.5±10.9 |
| IV | 0.365 (acetone) | 0.365 (acetone) | 5±3 |
| V | 0.498 (acetone) | 0.505 (acetone) | 11.1±5 |
| VI | 0.785 (acetone) | 0.772 (acetone) | 31.6±9 |

Some of the ammonium perchlorate crystals were selectively contaminated with the burning rate modifier, potassium permanganate, by allowing the ammonium perchlorate saturated solution to come into contact with the permanganate and then precipitated in the mixed solution. These modified crystals were then used in a composite propellant composition which comprises an oxidizer such as the ammonium perchlorate as herein prepared and a binder such as polyurethane, polybutadiene and others. Controlled oxidizer crystal size enables those preparing propellants, explosives, and pyrotechnics to improve the processibility.

The solvents for ammonium perchlorate used herein included tetrahydrofuran and acetone. Other suitable organic solvents may be used. The non-solvents used included decane, and other high boiling point (180° C.) hydrocarbon liquids. High boiling point kerosene with low volatile content can also be used. Soltrol 180 is a trademark for an odorless mineral spirit having a boiling point of about 180° C.

In addition, it is possible to construct a system consisting of volatile solvent and non-solvent, i.e., acetone and hexane. To carry out a cyclical operation of this type it would be desirable to construct a fractionating column such that two distillation streams are obtained, one containing only the non-solvent which would be returned to the precipitation pot, and the other containing the solvent which would be dripped through the ammonium perchlorate bed. The flow of both materials could be monitored by a conductivity meter, refractometer, vapor chromatography or other monitoring device to maintain constant composition in the precipitation chamber. A flow chamber can be also inserted in the flow chain to remove trace amounts of moisture that may be present in the original ammonium perchlorate.

What is claimed is:

1. A method for the preparation of ammonium perchlorate crystals of substantially uniform size and shape having well-defined crystalline structure which comprises:
   (a) percolating an organic solvent for ammonium perchlorate selected from the group consisting of tetrahydrofuran and acetone through a bed of ammonium perchlorate thereby forming a saturated solution of ammonium perchlorate;
   (b) precipitating said saturated solution into a solution comprising a mixture of a predetermined amount of an organic solvent for ammonium perchlorate selected from the group consisting of tetrahydrofuran and acetone and a predetermined amount of non-solvent for ammonium perchlorate selected from the group consisting of a high boiling mineral spirit, kerosene, decane and hexane whereby uniform crystals are formed.

2. The method in accordance with claim 1 wherein the organic solvent is tetrahydrofuran and the non-solvent is a high boiling mineral spirit.

3. The method in accordance with claim 1 wherein the solvent is acetone and the non-solvent is hexane.

4. The method in accordance with claim 1 wherein the solvent is tetrahydrofuran and the non-solvent is decane.

5. The method in accordance with claim 1 wherein said ammonium perchlorate is contaminated with potassium permanganate prior to percolating through said organic solvent.

References Cited

UNITED STATES PATENTS

| | | | |
|---|---|---|---|
| 3,160,535 | 12/1964 | Wells | 149—76 X |
| 3,222,231 | 12/1965 | Markels et al. | 149—76 X |
| 3,259,531 | 7/1966 | Lofberg | 149—76 |
| 3,383,180 | 5/1968 | Kralik et al. | |

STEPHEN J. LECHERT, JR., Primary Examiner

U.S. Cl. X.R.
423—476; 149—76